Patented May 9, 1933

1,908,529

UNITED STATES PATENT OFFICE

ALEXANDER MURRAY, OF ROCHESTER, NEW YORK, ASSIGNOR TO EASTMAN KODAK COMPANY, OF ROCHESTER, NEW YORK, A CORPORATION OF NEW YORK

COLLODION FOR WET PLATE PROCESSES

No Drawing.  Application filed March 18, 1930. Serial No. 436,917.

This invention relates to collodion for the wet plate process, and more particularly to a stable single solution to be used for coating wet plates and one which may be kept indefinitely.

An object of the invention is to make it possible to keep a single solution containing plain collodion and an iodizer so that it will not deteriorate and thereby cause a variation in its sensitivity or other photographic characteristics.

Hitherto it has been customary to use a solution of plain collodion consisting of nitrocellulose dissolved in alcohol and ether and to add to this at the time of use a so-called iodizer which consists of soluble metal halides dissolved in alcohol. The substances usually employed for this purpose are cadmium iodide, ammonium iodide, calcium chloride and strontium chloride.

The iodized collodion is then submitted to the action of a bath of silver nitrate, precipitating sensitive silver halides in the collodion and on its surface, and these are exposed while wet. When in the claims I use the term iodizer, I mean thereby soluble metal halides capable of use in this manner, this being the accepted term in the art for such a composite solution of several halides. After the plain collodion and iodizer are mixed the solution is then usable for a period varying from 8 to 30 days. From the beginning a progressive reaction sets in by which iodine is liberated and the solution gradually becomes discolored until it is quite dark due to the presence of free iodine. In this state the solution no longer can be depended upon to have its original photographic characteristics and this fact often causes a loss of material and work. The advantage inherent in a single solution which is stable will be obvious to those acquainted with the art.

I have found it possible to stabilize such a collodion-iodizer solution by adding to it a small amount of acetone. The amount of acetone required is about 0.2 per cent of the total amount of collodion and iodizer. This proportion will, of course, depend on the dilution of the collodion which varies within wide limits in known formulæ. My invention comprises the addition to such known formulæ including an iodizer of a relatively small amount of acetone which should be materially less than the amount of iodizer. If a solution is made up in this way it will retain its color without appreciable change indefinitely. Its photographic characteristics also remain unchanged. Such a stable collodion has a number of other advantages such as uniform photographic characteristics throughout its life, no chance of personal errors in iodizing and no waste due to discarding old material.

To accomplish this stabilization other equivalent ketones may also be used.

A specific example of the invention is the following formula for a stable iodized collodion, the formula being based on 1000 cc. of solvent. This formula is that found in "Handbook of Photo-Engraving" by N. S. Amstutz (1907) p. 126, the acetone only being added to the formula as given.

| | |
|---|---|
| Ethyl alcohol | 450 cc. |
| Ether | 550 cc. |
| Cellulose nitrate (pyroxylin) | 10.6 grams |
| Ammonium iodide | 4.0 grams |
| Cadmium iodide | 7.0 grams |
| Calcium chloride | 1.3 grams |
| Acetone | 2.0 grams |

The stabilizer may be added to any of the well known collodions, numerous formulæ for which are to be found in the literature. I contemplate as included within my invention all such modifications and equivalents as fall within the scope of the appended claims.

What I claim is:

1. A stabilized alcohol-ether solution of collodion containing an iodizer, and about 0.2% acetone to 1½ to 2% cellulose nitrate.

2. A stabilized collodion comprising a solution of cellulose nitrate, an iodizer and a ketone, the amount of ketone being less than half that of the iodizer.

3. A stabilized collodion comprising a solution of cellulose nitrate, an iodide and a ketone, the amount of ketone being materially less than that of the iodide.

4. A stabilized collodion comprising an alcohol-ether solution of cellulose nitrate, an iodide and acetone, the amount of acetone being less than half that of the iodide.

5. A stabilized collodion comprising a solution of cellulose nitrate, an iodizer and acetone, the amount of acetone being less than either the nitrate or the iodizer.

6. A stabilized collodion for use in a wet plate photographic process comprising nitrocellulose, soluble metal halides, solvents for the nitrocellulose and the halides, and acetone, the amount of acetone being less than one half of either the halides or the nitrocellulose.

Signed at Rochester, New York, this 13th day of March, 1930.

ALEXANDER MURRAY.